US007081428B1

(12) United States Patent
Thampi

(10) Patent No.: US 7,081,428 B1
(45) Date of Patent: Jul. 25, 2006

(54) CARBOXYLATE-CONTAINING PHOTOCATALYTIC BODY, MANUFACTURE AND USE THEREOF

(75) Inventor: Ravindranathan Thampi, Ecublens (CH)

(73) Assignee: Ecole Polytechnique Federale de Lausanne (EPFL), Lausanne (CH)

(*) Notice: Subject to any disclaimer, the term of this patent is extended or adjusted under 35 U.S.C. 154(b) by 342 days.

(21) Appl. No.: 10/312,627

(22) PCT Filed: Jun. 30, 2000

(86) PCT No.: PCT/CH00/00358

§ 371 (c)(1), (2), (4) Date: Feb. 27, 2003

(87) PCT Pub. No.: WO02/02232

PCT Pub. Date: Jan. 10, 2002

(51) Int. Cl.
*B01J 31/00* (2006.01)
*A62D 3/00* (2006.01)

(52) U.S. Cl. ...................... 502/159; 502/170; 502/171; 502/522; 588/301; 588/306

(58) Field of Classification Search ................ 502/159, 502/170, 439, 518, 522, 527.12, 527.15, 502/316, 350, 340–343, 351, 171; 588/301, 588/306, 402, 405, 406, 408
See application file for complete search history.

(56) References Cited

U.S. PATENT DOCUMENTS

| | | | | |
|---|---|---|---|---|
| 5,853,866 | A | 12/1998 | Watanabe et al. | |
| 6,228,480 | B1 * | 5/2001 | Kimura et al. | 428/328 |
| 6,929,862 | B1 * | 8/2005 | Hurst et al. | 428/432 |

FOREIGN PATENT DOCUMENTS

| | | |
|---|---|---|
| EP | 0 846 494 | 6/1998 |
| EP | 0 916 411 | 5/1999 |
| JP | 09-227752 | 9/1997 |
| JP | 11-171544 | 6/1999 |
| JP | 11-228875 | 8/1999 |
| JP | 2000-102598 | 4/2000 |

* cited by examiner

*Primary Examiner*—J. A. Lorengo
*Assistant Examiner*—J. Pasterczyk
(74) *Attorney, Agent, or Firm*—Leydig, Voit & Mayer, Ltd

(57) ABSTRACT

Supported photooxidation catalysts containing a metal oxide or metal ion as catalyst which is fixed to the support by means of carboxylate moieties are an alternative to existing such catalysts, particularly if low cost supports such as organic polymers, particularly polyethylene, are used. The supported photocatalysts can be used in mineralisation of organic pollutants in both liquids and gases and show reduced leaching of the catalyst and good resistance towards reactive oxygen species generated during the degradation process.

17 Claims, 3 Drawing Sheets

1(a) TOC (mg C/L) vs Time (h)

1(b) TOC (mg C/L) vs Time (h); inset: Abs. vs Wavelength (nm)

1(c) TOC (mg C/L) vs Time (h)

CARBOXYLATE-CONTAINING PHOTOCATALYTIC BODY, MANUFACTURE AND USE THEREOF

FIELD OF THE INVENTION

Industrial organic compounds such as chlorophenols, azo dyes, etc. are widely distributed in soils and waters. Chlorophenols are listed as highly toxic pollutants by governmental agencies. Azo-dyes do not undergo bacterial degradation in waste-water treatment plants due to the presence of aromatic and sulpho-aromatic groups. Oxidative photocatalytic reactions with suitable photocatalysts such as titanium dioxide and photo-Fenton processes with e.g. $Fe^{3+}$ ions are able to break down such molecules totally or partially so that cheaper biological process can be used as a second stage to achieve complete mineralisation. The present invention relates to the field of photocatalytic oxidative degradation of such organic pollutants from wastewaters, effluents and vent gases. Particularly it relates to the photocatalytic degradation of pollutants in wastewaters and effluents which are not easily mineralizable by mere biological (i.e. bacterial) degradation processes.

PRIOR ART

The literature dealing with photocatalytic degradation of such pollutants is abundant. In the prior art photocatalysts were often applied as suspensions, but costly problems associated with catalyst leaching, settling, flocculation and the need for eventual catalyst separation by filtration during post treatment, hindered their wide scale application in industry. In systems using photo-Fenton type photocatalytic degradation, removal of Fe ions after treatment is expensive. Therefore, catalyst immobilisation related research has attracted wide attention (see e.g. J. Fernandez, J. Bandara, A. Lopez, P. Albers and J. Kiwi, *J. Chem. Soc. Chem. Commun.* 1998, 1493). Simple coating of the catalyst over glass, ceramics and polymers often lead to catalyst leaching and dissolution (U. Stafford, K. A. Gray and P. V. Kamat, *J. Phys. Chem,* 1994, 98, 6343; H. Al-Ekabi and N. Serpone, *J. Phys. Chem.,* 1988, 92, 5726). There are reports on buoyant $TiO_2$-coated glass micro-bubbles (J. Schwitzgebel, J. G. Ekerdt, H. Gerischer and A. Heller, J. Phys. Chem., 1995, 99, 5633) and polystyrene beads made by thermal treatment (M. E. Fabiyi and R. L. Skelton, *J. Photochem. Photobiol. A: Chem*, 2000, 132, 121). Immobilized catalysts may show reduced activity which depends much on the materials and procedures adopted. Another problem generally noticed is the chemical attack by OH radicals on the polymer substrates (B. Ranby and J. F. Rabeck in 'Photo-degradation, Photo-oxidation and Photostabilization of Polymers', J. Wiley & Sons, London, 1975, p-290). Photocatalysts immobilized on expensive Nafion films (J. Fernandez, J. Bandara, A. Lopez, P. Albers and J. Kiwi, *J. Chem. Soc. Chem. Commun.* 1998, 1493) are not economically viable, since many industries can not afford high investments for waste water treatment plants.

In example 2 of EP-A-0 846 494 an acrylic resin plate and a methacrylic resin plate are treated with 2% sodium hydroxide solution at 80° C. for 30 minutes, washed and dried, then the plates are coated with titanium peroxide sol by dipping. In examples 3 and 4 a water absorbing tile and a float glass, coated with glass beads, are coated with a 50:1 mixture of titanium peroxide sol and titanium dioxide. No indications are given as to the nature of the fixation of the titanium to the surface of these photocatalytic bodies. The description states that any known procedures may be used to apply titanium oxide sol, titanium peroxide sol or mixtures therefrom ono the substrate, such as dipping, spraying and coating.

The task underlying the present invention is to find photocatalytic bodies with improved fixation to the carrier substrate, i.e. with reduced catalyst leaching, which however show stable and reproducible catalytic behaviour.

SUMMARY OF THE INVENTION

The solution to the above problem is given by the photocatalytic oxidative bodies of claim 1. It has unexpectedly been found that the bonding of photooxidative catalytic metal ions or metal oxides give highly active, easily utilizable catalytic systems for the degradation of organic pollutants, which do not lose appreciably their activity after multiple usage. The catalytic bodies exhibit, quite independently from the type of polymeric carrier used, good resistance to reactive oxygen species formed during the degradation process.

It is assumed that a significant part of the eventual bonding of the cations of the photooxidation catalyst occurs via carboxylate moieties —$COO^-$ present on the surface of the polymeric carrier, although other, unknown mechanisms of bonding might be involved as well, in addition to this one.

Further objects of the invention are processes for the manufacture of the above catalytic bodies and degradation processes for organic pollutants using these catalytic bodies.

DESCRIPTION OF THE FIGURES

FIG. 1*b* 4-chlorophenol; FIG. 1*c* 2,4-dichlorophenol) using: ○; a $TiO_2$-coated photocatalytic oxidative sheet of the invention, under illumination; ★: a suspension of $TiO_2$ (75 mg/L) under illumination; and ●: a $TiO_2$-coated photooxidative catalytic film of the invention, in the dark. The inset in FIG. 1*b* shows the absorption spectra of a) a polymer film without $TiO_2$ coating, b) after coating with $TiO_2$, and c) the $TiO_2$-coated film after six runs in catalytic degradation.

FIG. 2*a* shows the gradual decrease in total organic carbon content (TOC) upon photocatalytic oxidative degradation of 4-chlorophenol using a): a $Fe_2O_3$-coated photocatalytic oxidative sheet according to the invention in presence of 0.01 M $H_2O_2$, under illumination; b): same as a), but in the dark; c): using a $Fe_2O_3$ suspension (25 mg/L) in presence of 0.001 M $H_2O_2$, under illumination; d): same as c), but with 75 mg/L suspension; e): same as c), but in presence of 0.01 M $H_2O_2$, f): same as c), but with 75 mg/L suspension and in presence of 0.01 M $H_2O_2$.

FIG. 2*b* shows the gradual decrease in total organic carbon content (TOC) upon photocatalytic oxidative degradation of the azo dye Orange II, whereby the conditions in a) to f) are the same as in a) to f) of FIG. 2*a*, respectively.

DESCRIPTION OF THE INVENTION

Figure 1:
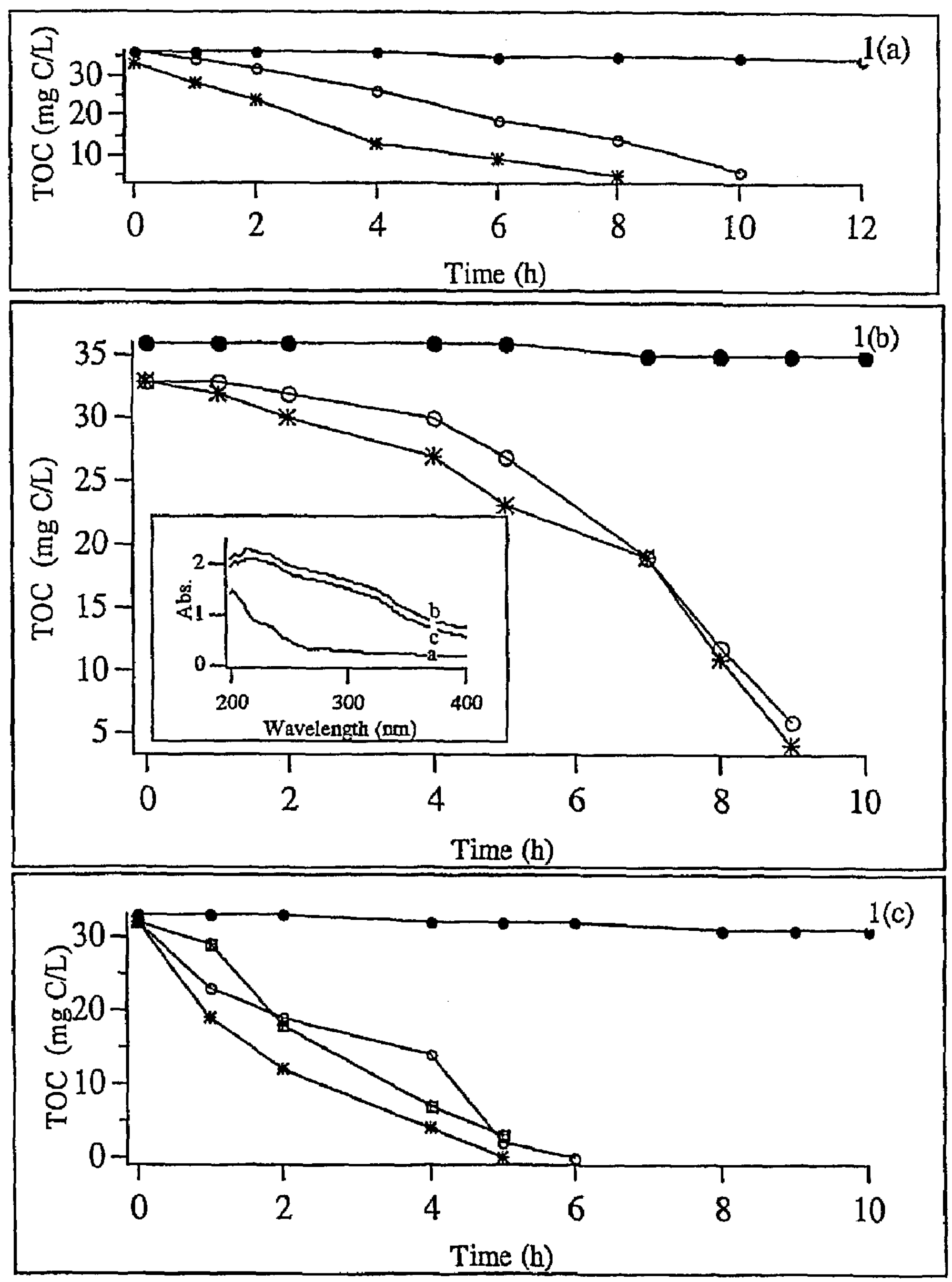
FIG. 1 shows the gradual decrease in total organic carbon content (TOC) upon degradation of three different model compounds (FIG. 1*a* 2-chlorophenol.

The catalytic body according to the invention may have the shape of beads, pellets, granules, sheets, membranes or any other shape which preferably has a high surface to volume ratio, in order to facilitate the oxidation process of the invention which is a heterogeneous process.

The metal cation containing photooxidative catalysts used in the present invention are known per se from the field of photodegradation of organic pollutants. Examples thereof are metal oxides containing metal cations such as $TiO_2$ ($Ti^{4+}$ containing), $Fe_2O_3$ ($Fe^{3+}$ containing), ZnO ($Zn^{2+}$ containing), $SrTiO_3$, $BaTiO_3$ ($Ti^{4+}$ containing), $In_2O_3$ ($In^{3+}$ containing), $Ta_2O_5$ ($Ta^{5+}$ containing) $WO_3$ ($W^{6+}$ containing), $Cu_2O$ ($Cu^+$ containing) and $RuO_2$ ($Ru^{4+}$ containing), and mixed oxides therefrom. Here, $TiO_2$, $Fe_2O_3$ and the mixtures therefrom are preferred according to the invention.

In cases where in the degradation reaction $H_2O_2$ is required more, and particularly when this should be generated in situ from $O_2$, the oxide ZnO is preferred. Production of excess $H_2O_2$ with ZnO as the catalyst may be further enhanced by co-attaching with the ZnO a small amount of cerium oxide, e.g. 0.001 to 1% by weight, based on the ZnO, to the surface of the polymeric carrier. For this the desired amount of cerium oxide or hydroxide may be added to the ZnO suspension in the bonding reaction.

ZnO is also preferred for degradation of alcohols (primary, secondary, tertiary).

The above oxides may be used in doped form, e.g. doped with Li, Al, Nb, Ti, Si, P, In, Ga, Sb, Cr, preferably in amounts of 0.1 to 10 atom %, more preferably 5 atoms. The doping is perferably done prior to bonding of the oxide to the carrier surface, preferably by known techniques such as metal salt solution impregnation, followed by high temperature calcination, milling and re-calcination. Metals such as Pt, Pd, Ag, Ni or their oxides may be loaded onto the catalytic metal oxide such as $TiO_2$ before loading onto the polymer. Again the loading may perferably be done prior to immobilization to the polymeric carrier.

Examples for the photooxidative catalyst are also bare metal cations themselves such as $Fe^{3+}$ and $Ru^{3+}$. Here, $Fe^{3+}$ is preferred.

The oxides may be employed in the form of powders or colloids.

Examples of organic polymeric carriers are organic polymers such as polyesters, polyethylenes, polypropylenes, polystyrenes, or polyamides, a preferred polymer is polyethylene, and a particularly preferred polymer is linear low density polyethylene (LLDPE).

Examples of inorganic polymeric carriers are glass and ceramics.

The term "surface carboxylate moiety" shall mean carboxylate groups —$COO^-$ that protrude from the surface(s) of the polymeric carrier and which exhibit a steric shielding low enough that they can co-ordinate to the metal cation(s) of the catalyst.

Some polymeric carriers may have such groups already present on any surface therefrom, when the polymeric carrier itself contains such groups; otherwise they may be introduced by

- coating the surfaces of the polymeric carrier with a compound containing carboxylates, carboxylic acid, carboxylic anhydride or acyl halogenide moieties;
- mixing the polymeric carrier with such an above compound;
- chemical derivatization of the surface(s) of the polymeric carrier.

If carboxylates are present in the polymeric carrier they may be present as part of the backbone (e.g. in a polyacrylic acid or poly(methacrylic)acid) or as terminal groups (e.g. as carboxylate terminals in a diol/diacid polyester). Some of these carboxylate groups will invariably be present at any formed surface of the polymeric carrier and protrude therefrom, although the surface density of these carboxylates (and therefore the achievable surface density of oxidative catalyst) is expected to vary depending on the type of polymeric carrier that is chosen.

A versatile way of introducing carboxylate, carboxylic acid, carboxylic anhydride or acyl halogenide moieties onto the surfaces of both organic and inorganic polymeric carriers of any type is the coating of the surface with a solution of a compound containing such moieties, preferably a polymeric compound, and drying. The solution may be formed with any solvent which is a solvent for the compound and is inert to the carboxylate derivative present in the compound, but is a non-solvent for the polymeric carrier. Particular examples of the solvent here are hydrocarbons such as benzene, toluene and halogenated hydrocarbons. The carboxylic acid, carboxylic anhydride or acyl halogenide moieties protruding from the surface of the formed coating may be prehydrolysed to form carboxylates, if reaction with photocatalytic cations is to be done, or they may be used as such, if reaction with photocatalytic oxides is to be done. The above coating technique is useful for producing a reactor vessel with its walls acting as the polymeric carrier.

Another way of producing the carboxylate-containing organic polymeric carrier is the mixing of any bulk organic polymer which does not necessarily contain such carboxylates (e.g. a low cost polymer such as polyethylene, polypropylene or polystyrene) in the molten state or in solution or by coextrusion with a specified amount of a carboxylate-containing or carboxylic acid derivative-containing organic polymer (see above). The resultant mixed polymer again will invariably have at its surface a certain amount of carboxylate or carboxylic acid derivative groups, due to the admixed compound. Here again the compound may contain carboxylic acids or reactive esters therefrom such as acyl halogenides or carboxylic anhydrides, in particularly those derived from maleic anhydride or maleic acid which may be pre-hydrolyzed to carboxylates.

"Surface carboxylate moieties" in the above meaning may also be introduced onto the surface(s) of a polymeric carrier which per se would be essentially or fully devoid of such moieties, by an appropiate surface treatment taking into consideration the nature of the polymeric carrier. Examples of such treatments would be the oxidation of surface aryl methyl groups present to corresponding surface aryl carboxylates by $KMnO_4$ or acid hydrolysis of surface nitrile groups (e.g. present from acrylonitrile precursors in the polymeric backbone such as in acrylonitrile/butadiene/styrene copolymer) to surface carboxylates.

Carboxylate groups are introducible into an organic polymeric carrier (both into the bulk or onto its surface) by a process commonly known in the art as "grafting". In this process sites of an existing polymer backbone which are susceptible to free radical hydrogen abstraction or deprotonation are linked to an $\alpha,\beta$-unsaturated carboxylic acid, carboxylate ester, carboxylic anhydride or acyl halogenide. The susceptible position is thus added by free-radical or ionic pathway to the double bond of the unsaturated carboxyl compound which becomes saturated in the process. Such positions on the backbone are e.g. tertiary carbon atoms or carbon atoms which are in $\alpha$ position to an electron-with-drawing group. The result of the grafting is thus a saturated carboxylic acid derivative which is bound to the polymer backbone via a C—C bond connecting the susceptible position of the polymer backbone and the β-carbon atom of the carboxylic acid derivative; e.g. employing maleic anhydride in the grafting process gives in the finished product grafted succinic anhydride, using acrylate gives grafted propionate, etc. Grafting is possible with many types of polymers, such as polyethylene, polypropylene, ethylene vinyl acetate, polystyrene, etc.

Examples of commercially available grafted polymeric carboxylate-containing compounds are the products marketed under the tradenames of Fusabond®, Bynel® and Surlyn®. In these products, manufactured by E.I. Dupont de Nemours & Company, maleic anhydride (Fusabond®, Bynel®) or methacrylate (Surlyn®) is grafted to polymeric backbones such as polyethylene or ethylene vinyl acetate. The contents of maleic anhydride in Fusabond is about 0.1 to about 1 percent by weight, depending on the type of Fusabond. Reference is also made to the Product Information Sheets of Dupont in which the different types of Fusabond, Bynel and Sarlyn polymers are further explained. The applicants also were able to obtain, at request, from the Geneva branch of Dupont a maleic anhydride-derivatized polyethylene (Fusabond series) which was very similar to the Dupont Bynel commercial product which contained about 1,5 percent by weight of grafted maleic anhydride. The usual application of these commercial products, according to the Product Information Sheets of Dupont, is not the use in photooxidation catalysis but the coupling with mineral fillers such as magnesium hydroxide or glass fibres, when mixing such fillers with polymers; or the compatibilisation of low-polarity polymers such as polypropylene with high-polarity polymers such as polyamide; or the impact modification of thermoplastic resins.

Carboxylate moieties are inroducible into inorganic polymeric supports such as glass or ceramics by silanizing reagents which contain carboxylic acids, carboxylates, carboxylic anhydrides or acyl halogenides. These inorganic carriers contain surface hydroxyls (e.g. AlOH, SiOH) which react with the silanizing reagent. These silanizing reagents may have the following general structure:

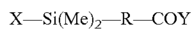

$$X—Si(Me)_2—R—COY$$

wherein X denotes a hydroxyl reactive group such as Cl, R denotes the spacer and COY denotes the respective carboxylate derivative. These silanizing reagents can be reacted with the glass or ceramics surface hydroxyls according to known procedures in the presence of a base. The silanizing reagents themselves are accessible by the Speyer reaction between chlorodimethylsilane $ClSi(Me)_2H$ and olefins (which in the present case contain the spacer and the carboxylate derivative COY) with hexachloroplatinic acid as catalyst.

Particularly preferred is the use of a carboxylic acid grafted or carboxylic anhydride grafted polymer, particularly a maleic anhydride-grafted linear low density polyethylene (LLDPE) as polymeric carrier.

The polymeric carrier may be initially present in a bulk form such as a commercially available granulate. This may be shaped, if necessary, to the desired shape such as pellets, sheets, membranes, etc. by known procedures of plastics treatment and forming. If the bulk polymer per se is devoid of surface carboxylates of carboxylic acid derivatives and had to be formed into the shape of interest, then any modification of the surface which introduces such carboxylates or carboxylic acid derivatives should be done after this forming.

The bonding of the photooxidative catalyst to the surface of the polymeric carrier may be performed by any of the following types of reactions:

a) For photooxidative catalysts in the form of metal oxides: Reaction of surface carboxylic acid, surface carboxylic anhydrides or acyl halogenides moieties with the metal oxide, preferably under heating and optionally under removal of condensation water; this reaction works because metal oxides invariably contain hydroxylic groups at their surface which react with the above moieties.

b) For photooxidative catalysts in the form of free metal ions: Reaction of surface carboxylates $—COO^-$ with the catalyst metal ions by contacting of a solution of the metal ion with the surface or by ion-exchange. The surface carboxylates may be pre-formed by alkaline hydrolysis of any carboxylic acid derivative (carboxylic acid, carboxylic ester, carboxylic anhydride or acyl halogenide) on the surface.

In the case of the photocatalytic metal oxides the reaction mixture will be a suspension of the oxide, besides the polymeric carrier, in some solvent. It may then be advantageous to use some high efficiency form of mixing such as sonication or vibromixing in order to allow more intimate contacting between the carrier surface and the oxide. Sonication, optionally with application of vacuum, is also advanageous in order to remove gas trapped in the cavities of the metal oxide which also helps in facilitating contact between the oxide and the carrier surface.

In any case the speed of the bonding reaction may be accelerated by heating the reaction system above the ambient temperature, e.g. to 50 to 80° C., preferably to about 75° C.

Optionally a preferably non-ionic surfactant may be used, in order to improve the wettening of the heterogeneous surfaces when using aqueous solvents.

The choice of solvent will depend on the bonding reaction to be effected. In general an aqueous solvent may be used; for the cases where a carboxylic anhydride or acyl halogenide is to be reacted with a surface hydroxyl-containing photocatalytic metal oxide an organic, essentially or fully water-free solvent such as an ether may also be used.

The loading of the surface of the polymeric carrier with photooxidative catalyst is governed primarily by the amount of available surface carboxylates present on the surface, when the reaction is allowed to go essentially to completion. This may be achieved by using large excesses of the photooxidative catalyst over the amount of available surface carboxyls. The amount of surface carboxyls in a given polymeric carrier may be determined by acid-base titration of an aliquot of the polymeric carrier or by ion exchange capacity measurement of such an aliquot and relating this to the specific surface of the carrier, as determined by e.g. BET measurements. An essentially complete reaction, but with no extra layers of non-bound catalyst on the surface, is preferred according to the invention. For this the above unreacted excess of the photooxidative catalyst is conveniently removed after the reaction by washing.

The term "environment of use" shall mean empty space which is to be filled with the medium to be decontaminated from organic pollutants by the catalytic process of the invention. This medium may be any liquid (particularly aqueous) or gaseous mixture containing such pollutants.

The degradation process according to the invention may run analogously to the known such processes, but using a photooxidative catalytic body according to the invention. In the cases of liquid or gaseous media the process may be a photooxidation in presence of molecular oxygen (e.g. in the case of $TiO_2$-containing catalytic bodies) or in liquid media it may also be a photo-Fenton type oxidation (e.g. with $Fe^{3+}$ containing catalytic bodies), whereby as usual some hydrogen peroxide is used. The hydrogen peroxide may here be used in an excess over the amount of pollutants to be degraded, preferably in at least twice the molar concentration of the sum of the pollutants, more preferably in at least ten times the concentration of the pollutants. Typically the hydrogen peroxide concentration may lie in the range of 0.001 to 0.05 M.

The amount of photooxidative catalytic body is not critical, as decreasing the amount merely slows down the degradation process. In the case of chlorophenols as pollutants in aqueous solutions in an initial concentration of 0.5 mM it was found that an essentially complete mineralization is obtained within about 10 hours (see examples for exact conditions).

The type of light source used may be one with an appreciable amount of near UV radiation, such as a low, medium or high pressure mercury arc lamp; the spectral intensity distribution and the wavelenght of the intensity maximum should preferably be adapted to the absorption spectrum of the photooxidation catalyst. The relations between type of photooxidation catalyst and nature of the light source are known from conventional photooxidative catalytic bodies.

The degradation process may be run in any vessel or reactor which is essentially transparent to the light to be used.

Particular examples of such organic, not easily mineralizable pollutants which can be degraded by the catalyst-containing articles and the oxidation process of the present invention are:

aliphatic primary, secondary and tertiary alcohols or glycols, such as methanol, ethanol, 2-propanol, tertiary butanol, ethylene glycol, propylene glycol, halogenated aliphatics such as methyl chloride, ethyl chloride, 1,1,1-trichloroethane, 1,2-dichloroethane, chloroform, 1,1,2,2-tetrachloroethylene, 1,1,1-trichloroacetaldehyde, 1,1,1-trichloroacetic acid, vinyl chloride and halogenated ketones;

aromatics such as benzene, naphthalene, alkylbenzenes (toluene, xylene), styrene, phenols, cresols, aromatic azo compounds (in particularly azo dyes such as those used in textile dyeing), anilines, pyridines, quinolines, thiophenes, aromatic sulfonic acids (benzenesulfonic acid, toluenesulfonic acid) and di- and triazines;

halogenated aromatics such as mono-, di, tri-, and polychlorinated benzenes, naphthalenes, phenols and aryl ethers, examples being chlorobenzene, 1,2-, 1,3- and 1,4-dichlorobenzene, 2-chlorophenol, 4-chlorophenol, pentachlorophenol and tetrachlorodibenzodioxine;

organic phosphorus compounds such as phosphoric acid or thiophosphoric acid esters (particularly those used in agriculture as pesticides).

The best embodiment of the catalytic body of the invention, i.e. titanium oxide photooxidation catalyst bound to a maleic anhydride-grafted LLDPE, shows surprising resistivity towards the reactive oxygen species formed during the photodegradation process. It also is a very cheap alternative to the known carrier-supported photocatalytic bodies. The catalytic bodies according to the invention do not show significant decrease in activity after several catalytic runs.

The invention will be further illustrated by the following examples. These should not be construed as limits of the scope of the invention.

In the examples percents refer to weight.

EXAMPLES

Example 1

Preparation of a Photocatalytic Oxidative $TiO_2$-Coated Sheet

A sheet of linear low density polyethylene (LLDPE) of 30 μm thickness, grafted with 1.5% of maleic anhydride, namely Fusabond 414 of Dupont, was taken as the polymeric carrier. The sheet was washed with water and then immersed in an aqueous suspension of $TiO_2$ (Degussa P25) containing 5 g oxide per liter of suspension. The suspension had been sonicated prior to use for 30 min. The suspension with the immersed sheet was heated to 75° C. for one hour. Then the sheet was removed from the suspension, dried at 100° C. and washed with water to remove loosely attached $TiO_2$ particles. The finished sheet contained a specific loading of about 310 mg $TiO_2/m^2$, as determined by the difference in weight observed between dried samples before and after $TiO_2$ loading.

Example 2

Preparation of a Photocatalytic Oxidative $Fe_2O_3$-Coated Sheet

The procedure of example 1 was used, except that $\alpha$-$Fe_2O_3$ powder was substituted for the $TiO_2$ powder. The finished sheet contained a specific loading of about 360 mg $Fe_2O_3/m^2$, as determined by the difference in weight observed between dried samples before and after $Fe_2O_3$ loading.

Example 3

Preparation of a Photocatalytic Oxidative $Fe^{3+}$-Coated Sheet

A sheet of linear low density polyethylene (LLDPE) of 30 μm thickness, grafted with 1.5% of maleic anhydride, namely Fusabond 414 of Dupont, was taken as the polymeric carrier. The sheet was washed with water and then immersed in an aqueous solution of $FeCl_3$ (Fluka) containing 5 g $FeCl_3$ per liter of solution. The solution with the immersed sheet was heated to 75° C. for one hour. Then the sheet was removed from the solution, dried at 100° C. and washed with water. $Fe^{3+}$ ions attached to the finished sheet when leached out completely using HCl acid and analyzed by calorimetric methods showed a loading of $3.05\times10^{-3}$ moles equivalents of $Fe^{3+}$ ions.

Example 4

Preparation of a Photocatalytic Oxidative ZnO-Coated Sheet

By the same procedure as in Example 1, but using ZnO instead of $TiO_2$, a photooxidative ZnO-coated catalytic sheet was obtained.

Example 5

Photocatalytic Oxidative Degradation of Chlorophenols

A photooxidative catalytic sheet (size 12×4 cm) as obtained in example 1 was used. The degradation reaction was run in a Pyrex glass reactor on 0.5 mM aqueous solutions of 2-chlorophenol, 4-chlorophenol and 2,4-dichlorophenol at a of pH 6. A 125 W medium pressure mercury arc lamp ($2.5\times10^{15}$ photons/sec. in the wavelength range of 360 to 390 nm) was used as the light source, with the short wavelength part being filtered by the Pyrex wall of the reactor. The decrease in the concentration of the chlorophenols was monitored by UV-VIS spectroscopy and by total organic carbon (TOC) analysis. The results are shown in the ○ curves of FIGS. 1a, 1b and 1c.

Similar runs, except that the illumination was omitted, gave the experimental ● curves of FIGS. 1a, 1b and 1c, respectively.

Example 6

Photocatalytic Oxidative Degradation of 4-Chlorophenol

A photooxidative catalytic sheet (size 12×4 cm) as obtained in example 2 was used. The degradation reaction was run under photo-Fenton conditions in a Pyrex glass reactor on a 0.7 mM aqueous solution of 4-chlorophenol at pH 3 and with 0.01 M $H_2O_2$. A Hanau Suntest lamp (80 $mW/cm^2$ total intensity, $1.6\times10^{16}$ photons/sec. in the wavelength range of 350 to 560 nm) was used as the light source, with the short wavelength part being filtered by the Pyrex wall of the reactor. The decrease in the concentration of the 4-chlorophenol was monitored by UV-VIS spectroscopy and by total organic carbon (TOC) analysis. The result is shown in curve a) of FIG. 2a.

Figure 2:
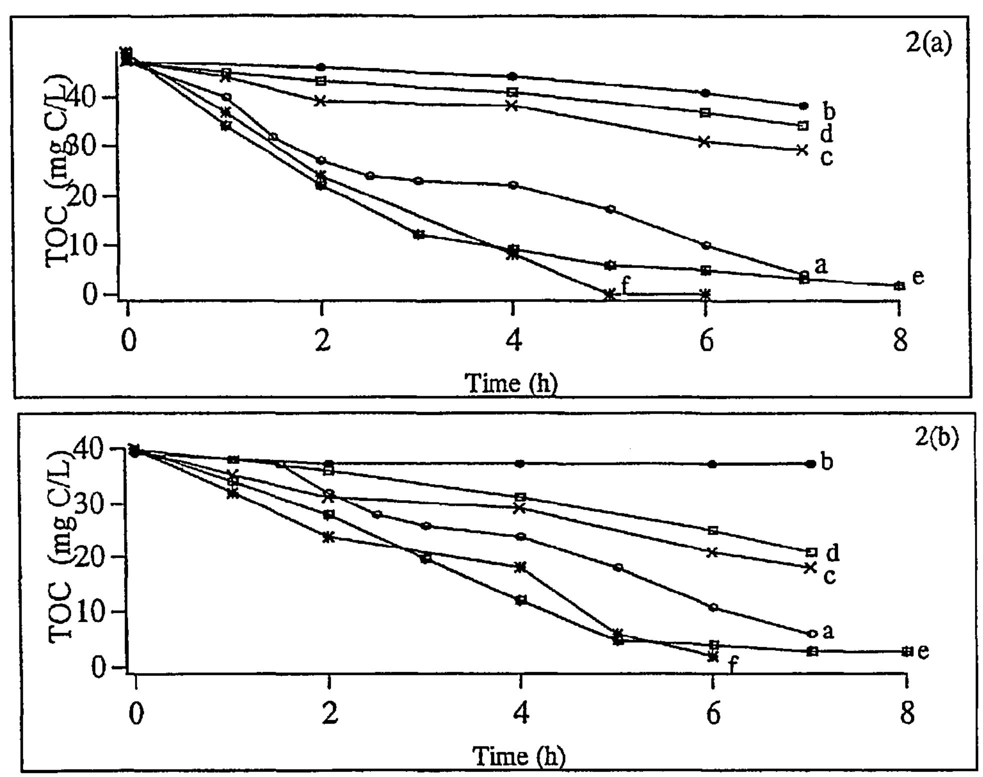
Figure 3:
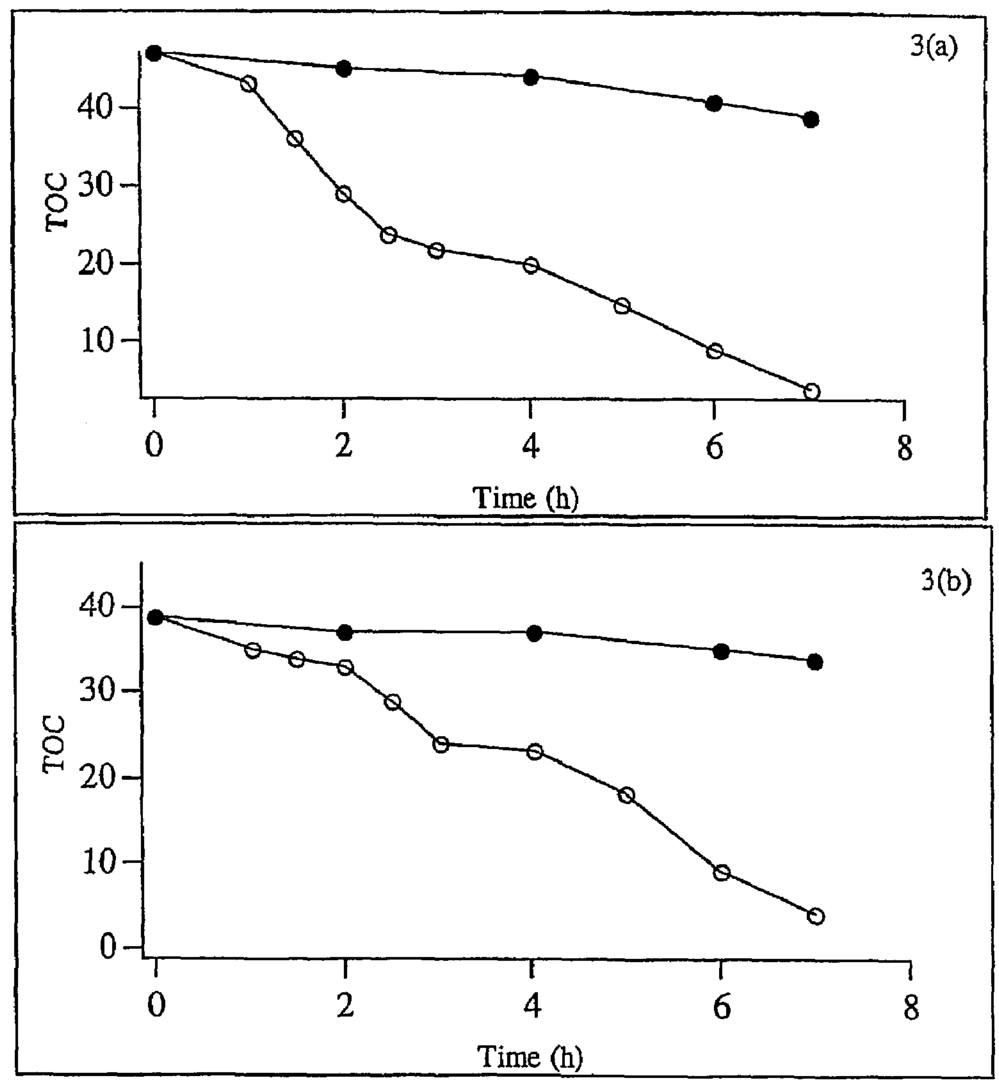
FIG. 3*a* shows the gradual decrease in total organic carbon content (TOC) upon photo-Fenton degradation of 4-chlorophenol using a $Fe^{3+}$-coated photooxidative catalytic sheet according to the invention in presence of 0.01 M $H_2O_2$, ○: under illumination; and ●: in the dark.
FIG. 3*b* shows the gradual decrease in total organic carbon content (TOC) upon photo-Fenton degradation of the azo dye orange II, with conditions and symbol meanings as in FIG. 3*a*.

A similar run, except that the illumination was omitted, gave the experimental curve b) of FIG. 2a).

Example 7

Photocatalytic Oxidative Degradation of Azo Dye Orange II

The same experimental setup as in example 6 was used, except that Orange II in a concentration of 0.2 mM was substituted for the 4-chlorophenol. The result is shown in curve a) of FIG. 2b).

A similar run, except that the illumination was omitted, gave the experimental curve b) of FIG. 2b).

Comparative Example 8

Photocatalytic Oxidative Degradation of Chlorophenols

The same experimental setup as in example 5 was used, except that the $TiO_2$ was used as a suspension of 75 mg/L in the reaction medium. The results are shown in the ★ curves of FIGS. 1a, 1b and 1c, respectively.

Comparative Examples 9 and 10

Photocatalytic Oxidative Degradation of 4-Chlorophenol

The same experimental setup as in example 6 was used, except that the $Fe_2O_3$ was used as a suspension of 25 or 75 mg/L in the reaction medium. The results are shown in curves e) and f), respectively, of FIG. 2a.

Comparative Examples 11 and 12

Photocatalytic Oxidative Degradation of 4-Chlorophenol

The same experimental setup as in example 6 was used, except that the $Fe_2O_3$ was used as a suspension of 25 or 75 mg/L and the $H_2O_2$ concentration was reduced to 0.001 M. The results are shown in curves c) and d), respectively, of FIG. 2a.

Comparative Examples 13 and 14

Photocatalytic Oxidative Degradation of Azo Dye Orange II

The same experimental setup as in example 7 was used, except that the $Fe_2O_3$ was used as a suspension of 25 or 75 mg/L. The results are shown in curves e) and f), respectively, of FIG. 2b.

Comparative Examples 15 and 16

Photocatalytic Oxidative Degradation of Azo Dye Orange II

The same experimental setup as in example 7 was used, except that the $Fe_2O_3$ was used as a suspension of 25 or 75 mg/L and the $H_2O_2$ concentration was reduced to 0.001 M. The results are shown in curves c) and d), respectively, of FIG. 2b.

The invention claimed is:

1. A catalytic body for heterogeneous photocatalytic oxidative degradation of organic material comprising an organic polymer with a polymer backbone which forms a polymeric carrier for the catalytic body; a surface facing towards an environment of use, a carboxylic acid derivative having a β-carbon atom and selected from the group consisting of a carboxylic acid, a carboxylic ester, a carboxylic anhydride and an acyl halogenide, being connected by said β-carbon atom contained therein to a carbon atom of said polymer backbone; and a metal cation(s)-containing photooxidation catalyst; wherein the photooxidation catalyst is bonded to carboxylate moieties $COO^-$ protruding from said surface and being obtained from said carboxylic acid derivative, which bond to metal cation(s) contained in the photooxidation catalyst.

2. A catalytic body according to claim 1, wherein the polymer is selected from the group consisting of polyethylene, linear low density polyethylene (LLDPE), polypropylene, polystyrene, polyester, polyamide and ethylene/vinyl acetate copolymer.

3. A catalytic body according to claim 2, wherein the photooxidation catalyst is bonded to carboxylate moieties $COO^-$ of a succinate and/or hemisuccinate which are connected to the backbone of the organic polymer.

4. A catalytic body according to claim 3, wherein the polymer is LLDPE and the total amount of connected succinate and/or hemisuccinate is 0.1 to 10 percent by weight based on LLDPE.

5. A catalytic body according to claim 1, wherein the photooxidation catalyst is selected from the group consisting of $TiO_2$, $ZnO$, $Fe_2O_3$, $Fe^{3+}$ and mixtures thereof.

6. A catalytic body according to claim 1, wherein the photooxidation catalyst is a metal oxide which is doped with an element selected from the group consisting of Li, Al, Nb, Ti, Si, P, In, Ga, Sb, and Cr or loaded with a metal selected from the group consisting of Pt, Pd, Ag, and Ni or with an oxide thereof.

7. A process for manufacture of a catalytic body for heterogeneous photocatalytic oxidative degradation of organic material, comprising a) providing a bulk organic polymer with a polymer backbone and with a carboxylic acid derivative having a β-carbon atom and selected from the group consisting of a carboxylic acid, a carboxylic ester, a carboxylic anhydride and an acyl halogenide, being connected by said β-carbon atom contained therein to a carbon atom of said backbone; and shaping said bulk polymer into a body with a desired shape and surface(s) pointing towards an environment of use, b) reacting carboxylate moieties $COO^-$ protruding from said surface(s) and being obtained by hydrolysis of said carboxylic acid derivative with a catalytically active photooxidative metal cation, whereby the photooxidative metal cation(s) are bonded to said protruding surface carboxylate moieties —$COO^-$.

8. A process for manufacture of a catalytic body for heterogeneous photocatalytic oxidative degradation of organic material, comprising a) providing a bulk organic polymer with a polymer backbone and with a carboxylic acid derivative having a β-carbon atom and selected from the group consisting of a carboxylic acid, a carboxylic ester, a carboxylic anhydride and an acyl halogenide, being connected by said β-carbon atom contained therein to a carbon atom of said backbone; and shaping said bulk polymer into a body with a desired shape and surface(s) pointing towards an environment of use, b) reacting said carboxylic acid derivative with a catalytically active photooxidative metal oxide comprising surface hydroxyls, whereby the photooxidative metal oxide is bonded by means of surface carboxylate moieties —$COO^-$ which protrude from said surface and which bond to metal cation(s) of the oxide.

9. The process of claim 7, wherein the polymer is selected from the group consisting of polyethylene, linear low density polyethylene (LLDPE), polypropylene, polystyrene, polyester, polyamide, and ethylene/vinyl acetate copolymer.

10. The process of claim 9, wherein the photooxidation catalyst is bonded to carboxylate moieties $COO^-$ of a succinate and/or hemisuccinate which are connected to the backbone of the organic polymer.

11. A catalytic body for the heterogeneous photocatalytic oxidative degradation of organic material, obtained by the process of claim 7.

12. Titanium dioxide bound to a succinate which is connected by a β-carbon atom contained therein to linear low-density polyethylene (LLDPE).

13. A catalytic body according to claim 3, wherein the photooxidation catalyst is a metal oxide which is doped with an element selected from the group consisting of Li, Al, Nb, Ti, Si, P, In, Ga, Sb, and Cr or loaded with a metal selected from the group consisting of Pt, Pd, Ag, and Ni or with an oxide thereof.

14. A process for the photocatalytic oxidative degradation of organic material in a medium containing said organic material, whereby a catalytic body according to claim 1 is contacted with the medium such that the surface of the body facing the environment of use comes into contact with the medium, and whereby the surface is illuminated in the presence of molecular oxygen and/or hydrogen peroxide with light in a wavelength and intensity appropriate to excite the photooxidative catalyst.

15. A catalytic body according to claim 2, wherein the photooxidation catalyst is a metal oxide which is doped with an element selected from the group consisting of Li, Al, Nb, Ti, Si, P, In, Ga, Sb, and Cr or loaded with a metal selected from the group consisting of Pt, Pd, Ag, and Ni or with an oxide thereof.

16. A catalytic body according to claim 2, wherein the photooxidation catalyst is selected from the group consisting of $TiO_2$, ZnO, $Fe_2O_3$, $Fe^{3+}$ and mixtues thereof.

17. A catalytic body according to claim 3, wherein the photooxidation catalyst is selected from the group consisting of $TiO_2$, ZnO, $Fe_2O_3$, $Fe^{3+}$ and mixtures thereof.

* * * * *